(12) United States Patent
Lee et al.

(10) Patent No.: US 9,423,551 B2
(45) Date of Patent: Aug. 23, 2016

(54) BACKLIGHT ASSEMBLY AND DISPLAY APPARATUS HAVING THE SAME

(71) Applicant: Samsung Display Co., Ltd., Yongin, Gyeonggi-Do (KR)

(72) Inventors: Dong-Hoon Lee, Hwaseong-si (KR); Min-Ki Nam, Anseong-si (KR); Hae-Il Park, Seoul (KR)

(73) Assignee: Samsung Display Co., Ltd. (KR)

( * ) Notice: Subject to any disclaimer, the term of this patent is extended or adjusted under 35 U.S.C. 154(b) by 38 days.

(21) Appl. No.: 14/335,069

(22) Filed: Jul. 18, 2014

(65) Prior Publication Data

US 2015/0253625 A1      Sep. 10, 2015

(30) Foreign Application Priority Data

Mar. 10, 2014  (KR) .................. 10-2014-0027818

(51) Int. Cl.
*G02F 1/1335* (2006.01)
*F21V 8/00* (2006.01)
*F21K 99/00* (2016.01)

(52) U.S. Cl.
CPC ............... G02B 6/0026 (2013.01); F21K 9/56 (2013.01); G02F 1/133603 (2013.01); *G02F 2001/133614* (2013.01)

(58) Field of Classification Search
CPC .... G02F 1/133621; F21K 9/56; G02B 6/0026
USPC .................. 349/96, 106, 64, 69, 71
See application file for complete search history.

(56) References Cited

U.S. PATENT DOCUMENTS

| 4,310,783 A | * | 1/1982 | Temple | ................. | H01J 29/185 |
| | | | | | 313/474 |
| 7,750,359 B2 | | 7/2010 | Narendran et al. | | |
| 7,804,103 B1 | | 9/2010 | Zhai et al. | | |
| 7,863,634 B2 | | 1/2011 | Haase | | |
| 2008/0001528 A1 | * | 1/2008 | Eida | ........................ | H01J 29/89 |
| | | | | | 313/501 |
| 2008/0211386 A1 | * | 9/2008 | Choi | ..................... | H01L 33/504 |
| | | | | | 313/503 |
| 2009/0213296 A1 | * | 8/2009 | Park | .................. | G02F 1/133603 |
| | | | | | 349/62 |
| 2010/0289044 A1 | * | 11/2010 | Krames | .................. | C09K 11/08 |
| | | | | | 257/98 |
| 2011/0241044 A1 | * | 10/2011 | Jang | .................. | G02F 1/133603 |
| | | | | | 257/98 |
| 2012/0162573 A1 | * | 6/2012 | Takahashi | .......... | C09K 11/7734 |
| | | | | | 349/61 |
| 2012/0274882 A1 | * | 11/2012 | Jung | ................. | G02F 1/133617 |
| | | | | | 349/96 |
| 2013/0010229 A1 | * | 1/2013 | Shin | .................. | G02F 1/133617 |
| | | | | | 349/62 |
| 2013/0016499 A1 | * | 1/2013 | Yee | ........................ | H01L 33/507 |
| | | | | | 362/97.1 |
| 2013/0026506 A1 | * | 1/2013 | Arbell | .................... | C09K 11/02 |
| | | | | | 257/88 |
| 2013/0335799 A1 | * | 12/2013 | Yoon | ...................... | G02B 26/02 |
| | | | | | 359/227 |
| 2014/0184987 A1 | * | 7/2014 | Kusuura | ............ | G02F 1/133602 |
| | | | | | 349/67 |
| 2015/0062494 A1 | * | 3/2015 | Park | ...................... | G02B 6/0068 |
| | | | | | 349/65 |

FOREIGN PATENT DOCUMENTS

| JP | 2010-021085 | 1/2010 |
| KR | 1020060046707 A | 5/2006 |
| KR | 1241627 | 3/2013 |
| KR | 1020130110963 A | 10/2013 |

* cited by examiner

*Primary Examiner* — Sang V Nguyen
(74) *Attorney, Agent, or Firm* — Innovation Counsel LLP

(57) ABSTRACT

A backlight assembly includes a light emitting part including a light source configured to generate a light having a first color and a phosphor disposed on the light source and having a second color, an optical filter part configured to filter a light from the light emitting part and a color conversion member disposed adjacent to the optical filter part and having a third color. A wavelength of the third color is shorter than a wavelength of the second color.

20 Claims, 8 Drawing Sheets

340

1300

BACKLIGHT ASSEMBLY AND DISPLAY APPARATUS HAVING THE SAME

PRIORITY STATEMENT

This application claims priority under 35 U.S.C. §119 to Korean Patent Application No. 10-2014-0027818, filed on Mar. 10, 2014 in the Korean Intellectual Property Office KIPO, the contents of which are herein incorporated by reference in their entireties.

BACKGROUND

1. Field

The present inventive concept relates to a display apparatus. More particularly, the present inventive concept relates to a display apparatus capable of preventing light-leakage.

2. Description of the Related Art

Generally, a liquid crystal display apparatus includes a liquid crystal display panel displaying an image using a light transmittance of a liquid crystal and a light source module providing a light to the liquid crystal display panel. For example, the light source module may be a backlight assembly.

The liquid crystal display panel includes a lower substrate having pixel electrodes and thin film transistors connected to the pixel electrodes, an upper substrate having a common electrode and color filters, and a liquid crystal layer disposed between the lower substrate and the upper substrate.

The light source module includes a plurality of light sources generating a light required to display an image on the liquid crystal display panel. For example, the light sources may include at least one of a cold cathode fluorescent lamp ("CCFL"), an external electrode fluorescent lamp ("EEFL"), a flat fluorescent lamp ("FFL"), and a light emitting diode ("LED").

Recently, a backlight assembly using a quantum dot has been developed. However, the backlight assembly using a quantum dot may have short lifespan due to heat, and a manufacturing cost may be increased.

SUMMARY

Exemplary embodiments of the present inventive concept provide a backlight assembly capable of having long lifespan without an increase of a manufacturing cost.

Exemplary embodiments of the present inventive concept also provide a display apparatus including the backlight assembly.

In an exemplary embodiment, the backlight assembly includes a light emitting part including a light source configured to generate a light having a first color and a phosphor disposed on the light source and having a second color, an optical filter part configured to filter a light from the light emitting part and a color conversion member disposed adjacent to the optical filter part and having a third color. A wavelength of the third color is shorter than a wavelength of the second color.

In an exemplary embodiment, the light source may include a light emitting diode chip. The first color may be blue.

In an exemplary embodiment, the second color may be red.

In an exemplary embodiment, the color conversion member may include a quantum dot. The third color may be green or yellow.

In an exemplary embodiment, the optical filter part may include a shortwave pass filter capable of transmitting a light having a short wavelength.

In an exemplary embodiment, the shortwave pass filter may have a multi-layer-structure that a layer including titanium dioxide and a layer including silicon dioxide are stacked alternately.

In an exemplary embodiment, the backlight assembly may further include a light guide plate configured to guide a light from the light emitting part.

In an exemplary embodiment, the color conversion member may be disposed between the optical filter part and the light guide plate. The color conversion member may have a bar shape.

In an exemplary embodiment, the color conversion member may be a quantum dot film disposed on a surface of the light guide plate.

In an exemplary embodiment, the light emitting part may be configured to generate a light having a magenta color.

In an exemplary embodiment, a display apparatus includes a display panel configured to display an image and a backlight assembly. The backlight assembly includes a light emitting part including a light source configured to generate a light having a first color and a phosphor disposed on the light source and having a second color, an optical filter part configured to filter a light from the light emitting part and a color conversion member disposed adjacent to the optical filter part and having a third color. A wavelength of the third color is shorter than a wavelength of the second color.

In an exemplary embodiment, the light source may include a light emitting diode chip. The first color may be blue.

In an exemplary embodiment, the second color may be red.

In an exemplary embodiment, the color conversion member may include a quantum dot. The third color may be green or yellow.

In an exemplary embodiment, the optical filter part may include a shortwave pass filter capable of transmitting a light having a short wavelength.

In an exemplary embodiment, the shortwave pass filter may have a multi-layer-structure that a layer including titanium dioxide and a layer including silicon dioxide are stacked alternately.

In an exemplary embodiment, the display apparatus may further include a light guide plate configured to guide a light from the light emitting part.

In an exemplary embodiment, the color conversion member may be disposed between the optical filter part and the light guide plate. The color conversion member may have a bar shape.

In an exemplary embodiment, the color conversion member may be a quantum dot film disposed on a surface of the light guide plate.

In an exemplary embodiment, the light emitting part may be configured to generate a light having a magenta color.

According to one embodiment, the light emitting part includes the light source including a light emitting diode chip generating a blue light and the phosphor mounted on the light source and having a red color. Thus, generating of light having a shortwave may be decreased. Therefore, a reliability of the light source may be improved and a lifespan of the light source may be increased.

In addition, a full-width-at-half-maximum of the light is decreased by the shortwave pass filter, so that color reproducing ratio of the light source may be increased.

In addition, the quantum dot according to an exemplary embodiment of the present inventive concept includes only one color, so that the optical absorption may be minimized.

Thus, a lifespan of a quantum dot rail may be increased and a manufacturing cost may be decreased.

BRIEF DESCRIPTION OF THE DRAWINGS

The above and other features of the present inventive concept will become more apparent by describing in detailed exemplary embodiments thereof with reference to the accompanying drawings, in which.

DETAILED DESCRIPTION OF THE INVENTIVE CONCEPT

Hereinafter, embodiments will be explained in detail with reference to the accompanying drawings.

Figure 1:
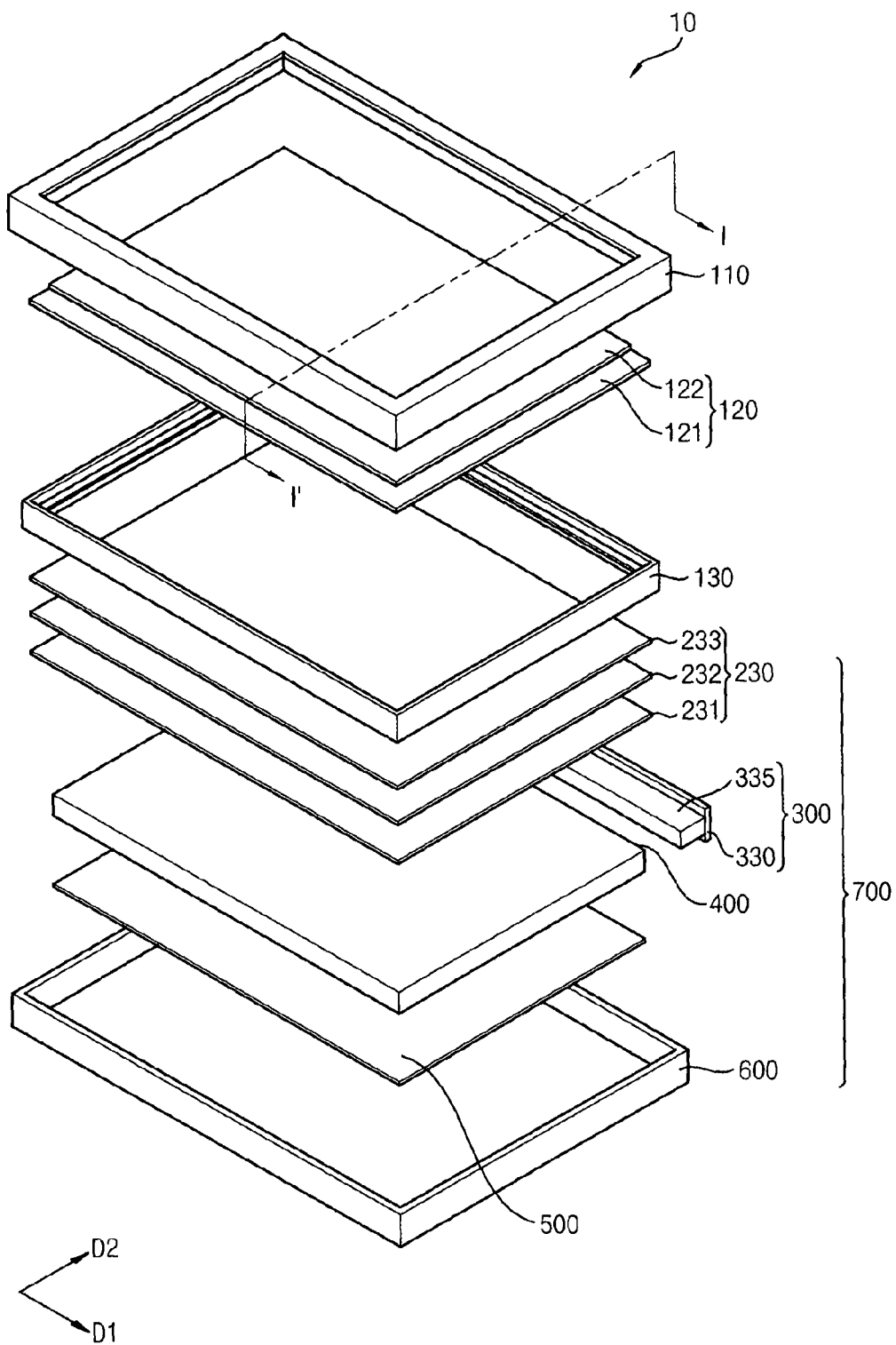
FIG. 1 is an exploded perspective view illustrating an exemplary embodiment of a display apparatus according to the inventive concept.
Figure 2:
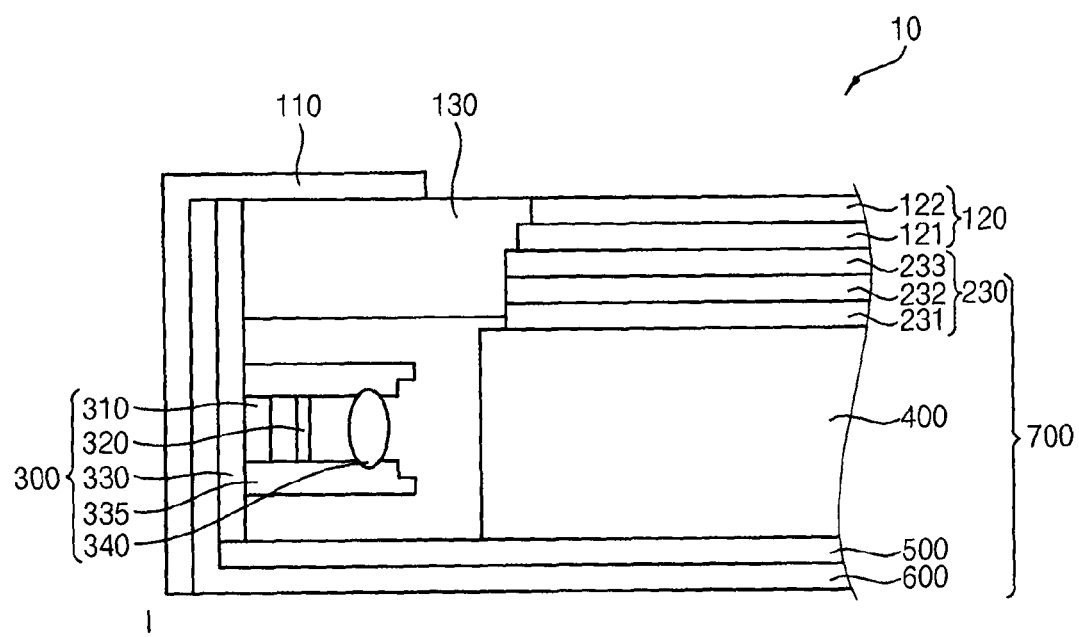
FIG. 2 is a cross-sectional view taken along line I-I' of FIG. 1.

FIG. 1 is an exploded perspective view illustrating an exemplary embodiment of a display apparatus 10 according to the inventive concept. FIG. 2 is a cross-sectional view taken along line I-I' of FIG. 1.

Referring to FIGS. 1 and 2, the display apparatus 10 according to an exemplary embodiment of the present inventive concept includes an upper receiving container 110, a display panel 120, a mold frame 130 and a backlight assembly 700.

The upper receiving container 110 is disposed over the display panel 120 to protect the display panel 120 from an external impact, and a window is formed through the upper receiving container 110 to extend to and expose a display area of the display panel 120. The upper receiving container 110 includes an upper portion covering a portion of the display panel 120, and a side wall vertically extending from the upper portion.

The display panel 120 includes a lower substrate 121, an upper substrate 122 facing the lower substrate 121, a liquid crystal layer disposed between the lower substrate 121 and the upper substrate 122, a first polarizing film disposed on a lower surface of the lower substrate 121 and a second polarizing film disposed on an upper surface of the upper substrate 122. An image is displayed on the display panel 120 using a light from the backlight assembly 700.

The lower substrate 121 may include thin film transistors arranged in a matrix configuration. A source electrode of the thin film transistor is electrically connected to a data line. A gate electrode of the thin film transistor is electrically connected to a gate line. A drain electrode of the thin film transistor is electrically connected to a pixel electrode. The pixel electrode may include a transparent conductive material. For example, the pixel electrode may include a transparent conductive material, such as indium tin oxide (ITO), indium zinc oxide (IZO) and etc. In addition, the pixel electrode may include titanium (Ti) and/or molybdenum titanium (MoTi).

The upper substrate 122 faces the lower substrate 121. The upper substrate 122 may include a color filter realizing a color. The upper substrate 122 may include a common electrode. The common electrode may face the pixel electrode. The common electrode may include a transparent conductive material. For example, the common electrode may include a transparent conductive material, such as indium tin oxide (ITO), indium zinc oxide (IZO) and etc. In addition, the common electrode may include titanium (Ti) and/or molybdenum titanium (MoTi).

When a power voltage is applied to the gate electrode of the thin film transistor that in turn turns on the thin film transistor, the electric field is formed between the pixel electrode and the common electrode. The electric field varies an aligning angle of the liquid crystal molecules of the liquid crystal layer disposed between the lower substrate 121 and the upper substrate 122. Thus, a light transmittance of the liquid crystal layer is varied in accordance with the variation of the aligning angle of the liquid crystal, so a desired image may be obtained.

The first polarizing film may be disposed on a lower surface of the lower substrate 121. The first polarizing film may have a first polarization axis. The first polarizing film may polarize a light in a first direction. The second polarizing film may be disposed on an upper surface of the upper substrate 122. The second polarizing film may have a second polarization axis. The second polarizing film may polarize a light in a second direction crossing the first direction. For example, the first polarization axis may be crossed with the second polarization axis.

The display panel 120 may further include a driving chip. The driving chip may drive the lower substrate 121. The driving chip generates a driving signal driving the lower substrate 121 in response to a control signal applied from other elements. In the present exemplary embodiment, the driving chip may be disposed at an end of the lower substrate 121. For example, the driving chip may be electrically connected to the lower substrate 121 by a chip-on-glass process.

The backlight assembly 700 is disposed under the display panel 120. The backlight assembly 700 includes a light source unit 300 generating light, the mold frame 130 covering an outside of the light source unit 300 and a lower receiving container 600 surrounding an outside of the mold frame 130.

The light source unit 300 is explained further below in reference to FIG. 3.

The light guide plate 400 may be disposed under the display panel 120. The light guide plate 400 may be formed as a plate shape. The light guide plate 400 may be disposed adjacent to the light source unit 300 to face a light exit surface of the Light source unit 300. The light guide plate 400 may guide a light emitted from the light source unit 300 toward the display panel 120.

The light guide plate 400 includes a transparent material to minimize a loss of a light from the light source unit 300. For example, the light guide plate 400 may include a material having superior strength, such as polymethylmethacrylate (PMMA).

Alternatively, in order to reduce a thickness of the light guide plate 400, the light guide plate 400 may include polycarbonate (PC). Polycarbonate is inferior in strength to polymethylmethacrylate, but polycarbonate is superior in heat-resistance to polymethylmethacrylate.

The optical sheets may improve luminance characteristics of a light emitted from the light guide plate 400. The optical sheets may include a reflecting sheet 500, a diffusion sheet 231 and prism sheets 232 and 233.

The reflecting sheet 500 may be disposed under the light guide plate 400. The reflecting sheet 500 reflects light leaked through a lower surface of the light guide plate 400 back to the light guide plate 400, so that light efficiency is enhanced.

The diffusion sheet 231 may be disposed on the light guide plate 400. The diffusion sheet 231 may diffuse a light exiting from the light guide plate 400.

The prism sheets 232 and 233 may be disposed on the diffusion sheet 231. The prism sheets 232 and 233 may condense a light exiting from the light guide plate 400. For example, the prism sheets 232 and 233 may include a vertical prism sheet condensing a light in a vertical direction and a horizontal prism sheet condensing a light in a horizontal direction.

The mold frame 130 may cover an outside of the light source unit 300 to expose a lower surface of the light source unit 300. The mold frame 130 may be engaged with the display panel 120 disposed over the light source unit 300. The mold frame 130 may be formed as a frame shape. The mold frame 130 may be formed with a macromolecule material. For example, the mold frame 130 may include a material having superior strength, such as polymethylmethacrylate (PMMA).

Alternatively, in order to reduce a thickness of the mold frame 130, the mold frame 130 may include polycarbonate (PC). Polycarbonate is inferior in strength to polymethylmethacrylate, but polycarbonate is superior in heat-resistance to polymethylmethacrylate.

Figure 3:
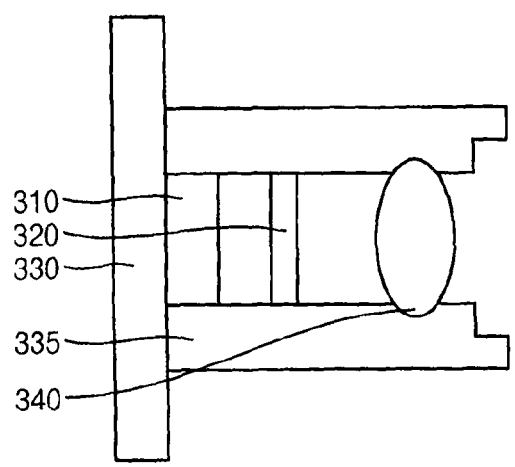
FIG. 3 is a cross-sectional view illustrating an exemplary embodiment of a light source unit according to the inventive concept.

FIG. 3 is a cross-sectional view illustrating an exemplary embodiment of the light source unit 300 according to the inventive concept.

Referring to FIG. 3, the light source unit 300 may include a light emitting part 310, an optical filter part 320, a flexible printed circuit board 330, a holding part 335, a color conversion member 340, and a plurality of optical sheets.

The flexible printed circuit board 330 may provide the light emitting part 310 disposed thereon with driving power. In the present exemplary embodiment, the flexible printed circuit board 330 may be disposed under the lower substrate 121 to be adjacent to an end of the display panel 120. For example, the flexible printed circuit board 330 may include a resin having flexibility. The flexible printed circuit board 330 may include a metal line disposed thereon.

The light emitting part 310 is disposed on the flexible printed circuit board 330. The light emitting part 310 may generate a light. In the present exemplary embodiment, the light emitting part 310 may be mounted on a surface of the flexible printed circuit board 330. For example, the light emitting part 310 may include a light emitting diode (LED).

The light emitting part 310 may include a light source generating a light having a first color and a phosphor disposed on the light source and having a second color. For example, the first color may be blue and the second color may be red. The number of the light emitting part(s) 310 may be determined in consideration of size and brightness of the display panel 120. A structure of light emitting part 310 is explained in detail referring to FIG. 4.

The optical filter part 320 may be disposed adjacent to the light emitting part 310. The optical filter part 320 may filter a light from the light emitting part 310. For example, the optical filter part 320 may include a shortwave pass filter capable of transmitting a light having a short wavelength. A structure of optical filter part 320 is explained in detail referring to FIG. 5.

The color conversion member 340 may be disposed adjacent to the optical filter part 320. The color conversion member 340 may have a third color. A wavelength of the third color may be shorter than a wavelength of the second color. The color conversion member 340 may include a quantum dot. The color conversion member 340 may a bar shape. The color conversion member 340 may convert a light from the optical filter part 320. Alternatively, the color conversion member 340 may include a phosphor having the third color.

The holding portion 335, sometimes called a holding part 335, may hold the light emitting part 310, the optical filter part 320 and the color conversion member 340. The holding portion 335 may have an opening facing the light guide plate 400. Thus, a light from the color conversion member 340 may be provided to the light guide plate 400. For example, the holding portion 335 may include glass material.

Figure 4:
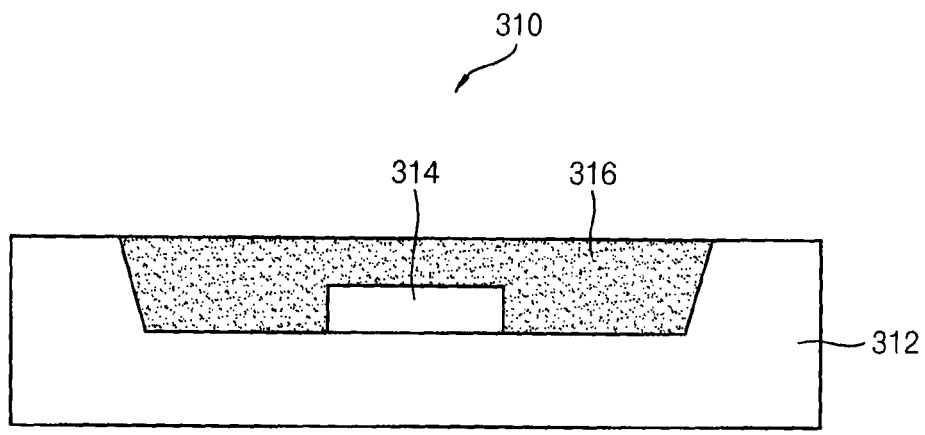
FIG. 4 is a cross-sectional view illustrating an exemplary embodiment of a light emitting part according to the inventive concept.

FIG. 4 is a cross-sectional view illustrating an exemplary embodiment of the light emitting part 310 according to the inventive concept.

Referring to FIG. 4, the light emitting part 310 according to an exemplary embodiment of the present inventive concept includes a receiving container 312, a light source 314 and a phosphor 316.

The receiving container 312 may receive the light source 314 and the phosphor 316. The receiving container 312 includes an upper surface and a bottom surface.

The light source 314 is disposed on the bottom surface of the receiving container 312. In the present exemplary embodiment, the light source 314 may include a light emitting diode chip. The light source 314 may generate a light having a first color. For example, the light source 314 may be a light emitting diode chip generating a light having a blue color.

The phosphor 316 fills a receiving area formed between the upper surface and the bottom surface of the receiving container 312. In the present exemplary embodiment, the phosphor 316 may be a red phosphor. The light source 314 generates the blue light and the phosphor 316 generates a red light based on the blue light. The blue light of the light source 314 and the red light of the phosphor 316 are mixed so that the light emitting part 310 emits the magenta light. For example, the phosphor 316 may be a nitride phosphor. In addition, the phosphor 316 may be a silicate phosphor.

In the present exemplary embodiment, the light emitting part 310 includes the light source 314 including a light emitting diode chip generating a blue light and the phosphor 316 mounted on the light source 314 and having a red color. Thus, generating of light having a shortwave may be decreased. Therefore, a reliability of the light source may be improved and a lifespan of the light source may be increased.

Figure 5:
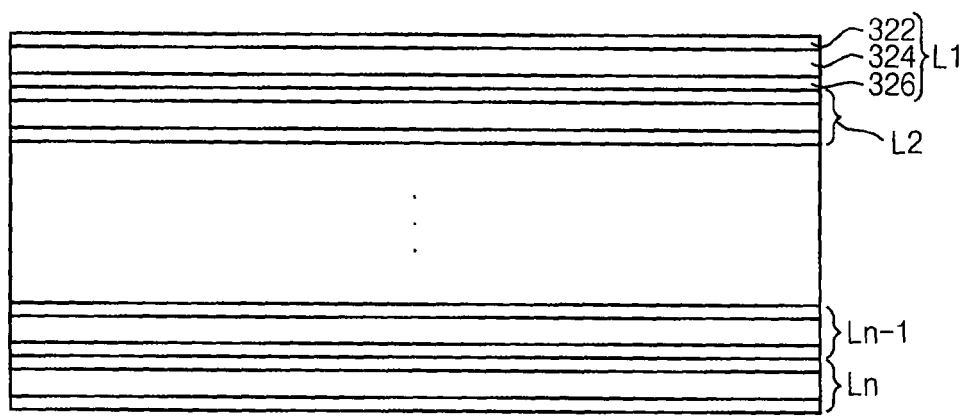
FIG. 5 is a cross-sectional view illustrating an exemplary embodiment of an optical filter part including a shortwave pass filter according to the inventive concept.

FIG. 5 is a cross-sectional view illustrating an exemplary embodiment of the optical filter part 320, e.g., including a shortwave pass filter, according to the inventive concept.

Referring to FIGS. 2, 3, 5, the optical filter part 320 may be disposed adjacent to the light emitting part 310. The optical filter part 320 may filter a light from the light emitting part 310. For example, the optical filter part 320 may include a shortwave pass filter capable of transmitting a light having a short wavelength.

The shortwave pass filter according to an exemplary embodiment of the present inventive concept may have a multi-layer-structure that a plurality of thin film layers are stacked. For example, the shortwave pass filter may have a multi-layer-structure that a layer including titanium dioxide and a layer including silicon dioxide are stacked alternately.

In the present exemplary embodiment, the shortwave pass filter may have a structure that a plurality of thin film layers are stacked. When the number of the thin film layers is more than nine, a transmissivity may be maximized. A first thin film layer L1 may include a first layer 322, a second layer 324 and a third layer 326.

The first layer 322 may be a thin film layer having a first thickness. The first layer 322 may include silicon dioxide. The second layer 324 may be a thin film layer having a second thickness twice as thick as the first thickness. The second layer 324 may include titanium dioxide. The third layer 326 may be a thin film layer having the first thickness. The third layer 326 may include silicon dioxide. The first layer 322 and the third layer 326 may be substantially same. The first thin film layer L1 may be a layer that the first layer 322, the second layer 324 and the third layer 326 are stacked sequentially.

In the present exemplary embodiment, the shortwave pass filter may have a multi-layer-structure that a plurality of thin film layers having the same structure as the first thin film layer L1 are stacked. For example, the first thin film layer L1 and a second thin film layer L2 are stacked sequentially. Thus, a third layer 326 of the first thin film layer L1 contacts with a first layer of the second thin film layer L2. Accordingly, a third layer 326 of the first thin film layer L1 having the first thickness and including silicon dioxide and a first layer of the second thin film layer L2 having the first thickness and including silicon dioxide are stacked sequentially, so that a layer having the second thickness and including silicon dioxide may be formed. Therefore, the shortwave pass filter may have a multi-layer-structure that a layer having the second thickness and including silicon dioxide and a layer having the second thickness and including titanium dioxide are stacked alternately. In addition, when the number of the thin film layers is more than nine, a transmissivity may be maximized.

In the present exemplary embodiment, the shortwave pass filter may filter a light from the light emitting part 310. The light emitting part 310 includes a light source generating a blue light and a red phosphor, so that the light emitting part 310 generates a light having magenta color. Only a light having a short wavelength is able to pass through the shortwave pass filter. Thus, the shortwave pass filter may decrease a full-width-at-half-maximum of the light having magenta color. Therefore, a full-width-at-half-maximum of the light is decreased, so that color reproducing ratio of the light source may be increase.

Figure 6:
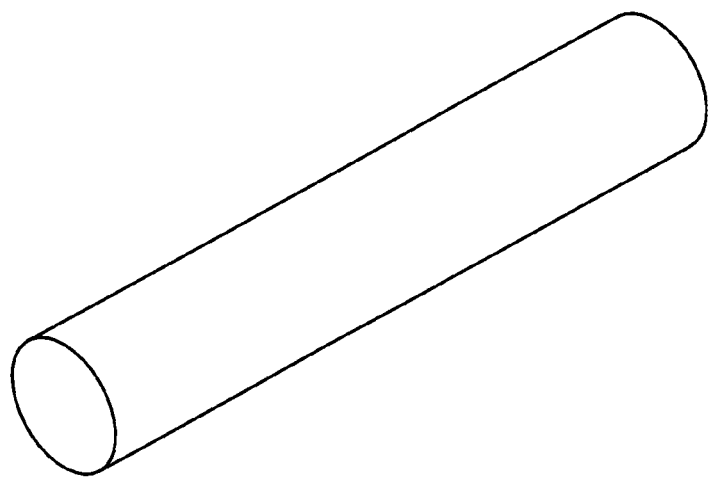
FIG. 6 is a cross-sectional view illustrating an exemplary embodiment of a color conversion member including a quantum dot rail according to the inventive concept.

FIG. 6 is a cross-sectional view illustrating an exemplary embodiment of the color conversion member 340, e.g., including a quantum dot rail, according to the inventive concept.

Referring to FIGS. 2, 3, 6, the color conversion member 340 according to an exemplary embodiment of the present inventive concept may be disposed adjacent to the optical filter part 320. The color conversion member 340 may have a third color. A wavelength of the third color may be shorter than a wavelength of the second color. The color conversion member 340 may include a quantum dot. The color conversion member 340 may a bar shape. The color conversion member 340 may convert a light from the optical filter part 320. For example, the second color may be red and the third color may be green. Alternately, the second color may be red and the third color may be yellow. Although the color conversion member 340 has a bar shape having an oval shape in a cross-sectional view in the present exemplary embodiment, the present inventive concept is not limited thereto. Alternately, the color conversion member 340 may have a bar shape having a rectangular shape in a cross-sectional view.

In the present exemplary embodiment, the color conversion member 340 includes a quantum dot rail including only one color. When a quantum dot includes more than two colors, a heating value due to an optical absorption may be increased. In addition, the heating value is increased, so that a lifespan of the quantum dot rail may be decreased. However, the quantum dot rail according to an exemplary embodiment of the present inventive concept includes a quantum dot having only one color, so that the optical absorption may be minimized. Thus, a lifespan of the quantum dot rail may be increased and a manufacturing cost may be decreased.

Figure 7:
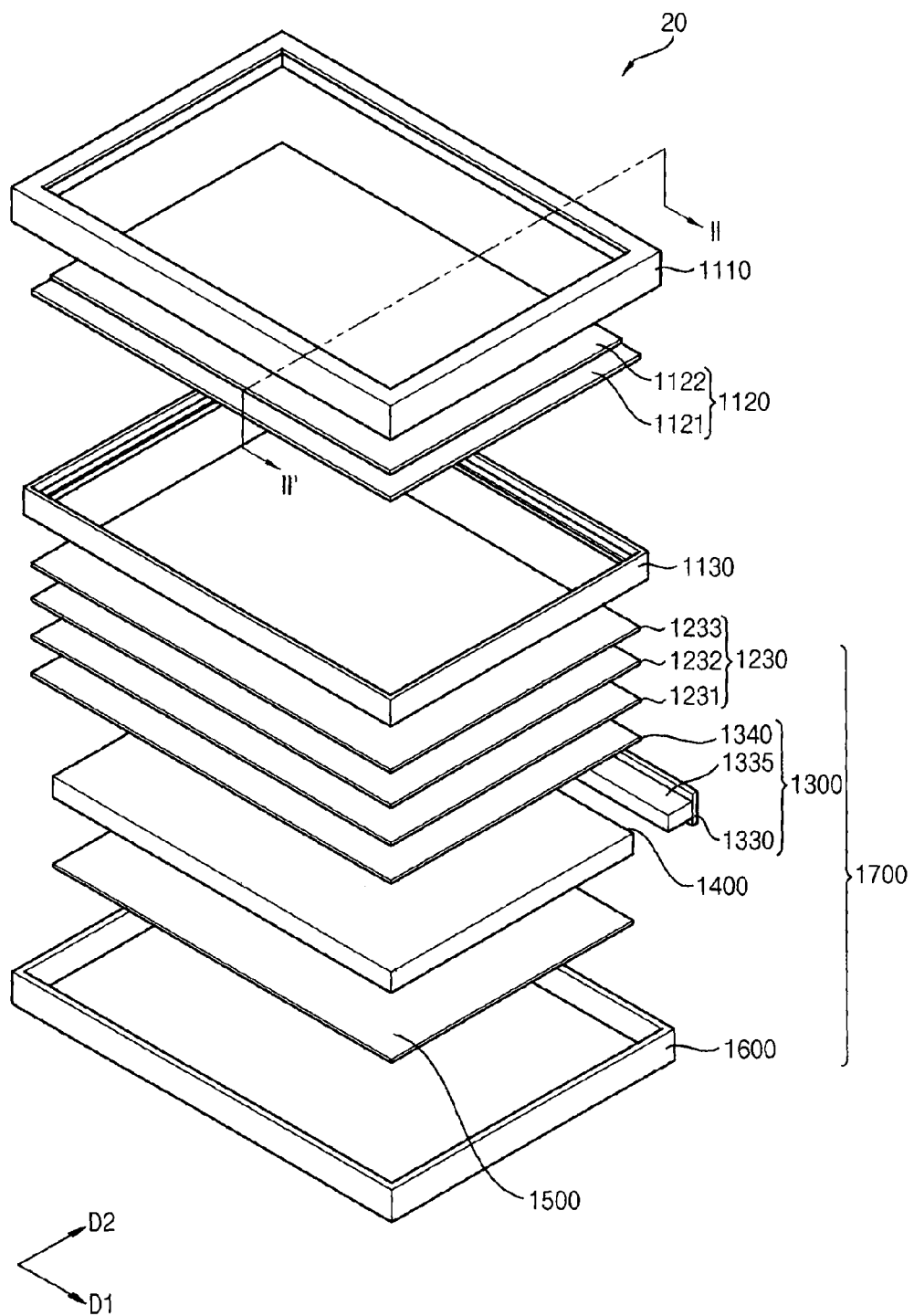
FIG. 7 is an exploded perspective view illustrating an exemplary embodiment of a display apparatus according to the inventive concept.
Figure 8:
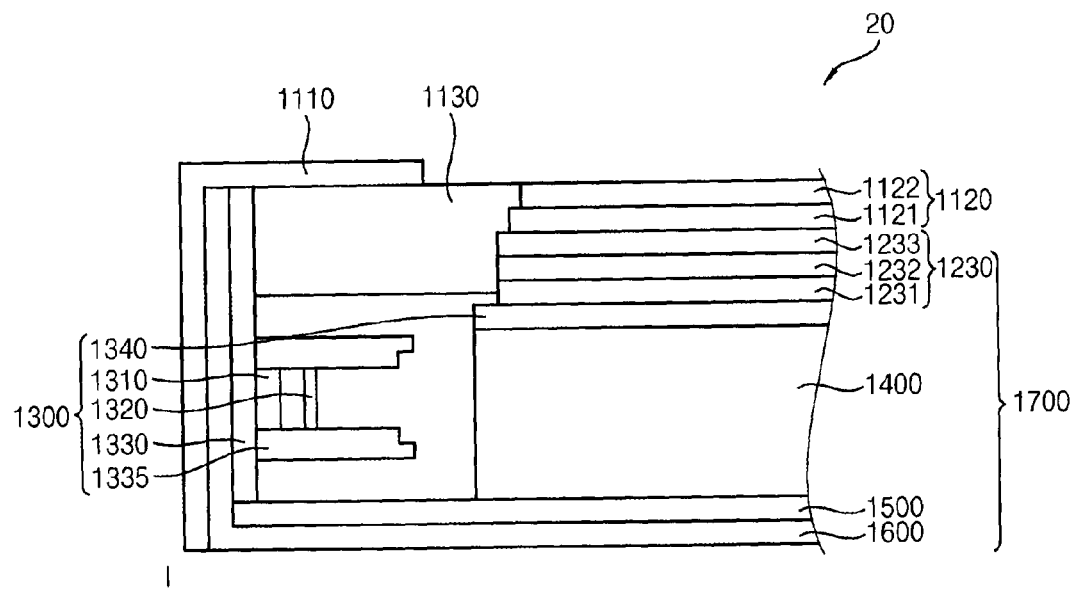
FIG. 8 is a cross-sectional view taken along line II-IF of FIG. 7.

FIG. 7 is an exploded perspective view illustrating an exemplary embodiment of a display apparatus 20 according to the inventive concept. FIG. 8 is a cross-sectional view taken along line II-II' of FIG. 7.

Referring to FIGS. 7 and 8, the display apparatus 20 according to an exemplary embodiment of the present inventive concept includes an upper receiving container 1110, a display panel 1120, a mold frame 1130 and a backlight assembly 1700.

The upper receiving container 1110 is disposed over the display panel 1120 to protect the display panel 1120 from an external impact, and a window is formed through the upper receiving container 1110 to extend to and expose a display area of the display panel 1120. The upper receiving container 1110 includes an upper portion covering a portion of the display panel 1120, and a side wall vertically extending from the upper portion.

The display panel 1120 includes a lower substrate 1121, an upper substrate 1122 facing the lower substrate 1121, a liquid crystal layer disposed between the lower substrate 1121 and the upper substrate 1122, a first polarizing film disposed on a lower surface of the lower substrate 1121 and a second polarizing film disposed on an upper surface of the upper substrate 1122. An image is displayed on the display panel 1120 using a light from the backlight assembly 1700.

The lower substrate 1121 may include thin film transistors arranged in a matrix configuration. A source electrode of the thin film transistor is electrically connected to a data line. A gate electrode of the thin film transistor is electrically connected to a gate line. A drain electrode of the thin film transistor is electrically connected to a pixel electrode. The pixel electrode may include a transparent conductive material. For example, the pixel electrode may include a transparent conductive material, such as indium tin oxide (ITO), indium zinc oxide (IZO) and etc. In addition, the pixel electrode may include titanium (Ti) and/or molybdenum titanium (MoTi).

The upper substrate 1122 faces the lower substrate 1121. The upper substrate 1122 may include a color filter realizing a color. The upper substrate 1122 may include a common electrode. The common electrode may face the pixel electrode. The common electrode may include a transparent conductive material. For example, the common electrode may include a transparent conductive material, such as indium tin oxide (ITO), indium zinc oxide (IZO) and etc. In addition, the common electrode may include titanium (Ti) and/or molybdenum titanium (MoTi).

When a power voltage is applied to the gate electrode of the thin film transistor that in turn turns on the thin film transistor, the electric field is formed between the pixel electrode and the common electrode. The electric field varies an aligning angle of the liquid crystal molecules of the liquid crystal layer disposed between the lower substrate 1121 and the upper substrate 1122. Thus, a light transmittance of the liquid crystal layer is varied in accordance with the variation of the aligning angle of the liquid crystal, so a desired image may be obtained.

The first polarizing film may be disposed on a lower surface of the lower substrate 1121. The first polarizing film may have a first polarization axis. The first polarizing film may polarize a light in a first direction. The second polarizing film may be disposed on an upper surface of the upper substrate 1122. The second polarizing film may have a second polarization axis. The second polarizing film may polarize a light in a second direction crossing the first direction. For example, the first polarization axis may be crossed with the second polarization axis.

The display panel 1120 may further include a driving chip. The driving chip may drive the lower substrate 1121. The driving chip generates a driving signal driving the lower substrate 1121 in response to a control signal applied from other elements. In the present exemplary embodiment, the driving chip may be disposed at an end of the lower substrate 1121. For example, the driving chip may be electrically connected to the lower substrate 1121 by a chip-on-glass process.

The backlight assembly 1700 is disposed under the display panel 1120. The backlight assembly 1700 includes a light source unit 1300 generating light, a mold frame 1130 covering an outside of the light source unit 1300 and a lower receiving container 1600 surrounding an outside of the mold frame 1130.

The light source unit 1300 is explained in further detail below with reference to FIG. 9.

The light guide plate 1400 may be disposed under the display panel 1120. The light guide plate 1400 may be formed as a plate shape. The light guide plate 1400 may be disposed adjacent to the light source unit 1300 to face a light exit surface of the light source unit 1300. The light guide plate 1400 may guide a light emitted from the light source unit 1300 toward the display panel 1120.

The light guide plate 1400 includes a transparent material to minimize a loss of a light from the light source unit 1300. For example, the light guide plate 1400 may include a material having superior strength, such as polymethylmethacrylate (PMMA).

Alternatively, in order to reduce a thickness of the light guide plate 1400, the light guide plate 1400 may include polycarbonate (PC). Polycarbonate is inferior in strength to polymethylmethacrylate, but polycarbonate is superior in heat-resistance to polymethylmethacrylate.

The optical sheets may improve luminance characteristics of a light emitted from the light guide plate 1400. The optical sheets may include a reflecting sheet 1500, a diffusion sheet 1231 and prism sheets 1232 and 1233.

The reflecting sheet 1500 may be disposed under the light guide plate 1400. The reflecting sheet 1500 reflects light leaked through a lower surface of the light guide plate 1400 back to the light guide plate 1400, so that light efficiency is enhanced.

The diffusion sheet 1231 may be disposed on the light guide plate 1400. The diffusion sheet 1231 may diffuse a light exiting from the light guide plate 1400.

The prism sheets 1232 and 1233 may be disposed on the diffusion sheet 1231. The prism sheets 1232 and 1233 may condense a light exiting from the light guide plate 1400. For example, the prism sheets 1232 and 1233 may include a vertical prism sheet condensing a light in a vertical direction and a horizontal prism sheet condensing a light in a horizontal direction.

The mold frame 1130 may cover an outside of the light source unit 1300 to expose a lower surface of the light source unit 1300. The mold frame 1130 may be engaged with the display panel 1120 disposed over the light source unit 1300. The mold frame 1130 may be formed as a frame shape. The mold frame 1130 may be formed with a macromolecule material. For example, the mold frame 1130 may include a material having superior strength, such as polymethylmethacrylate (PMMA).

Alternatively, in order to reduce a thickness of the mold frame 1130, the mold frame 1130 may include polycarbonate (PC). Polycarbonate is inferior in strength to polymethylmethacrylate, but polycarbonate is superior in heat-resistance to polymethylmethacrylate.

Figure 9:
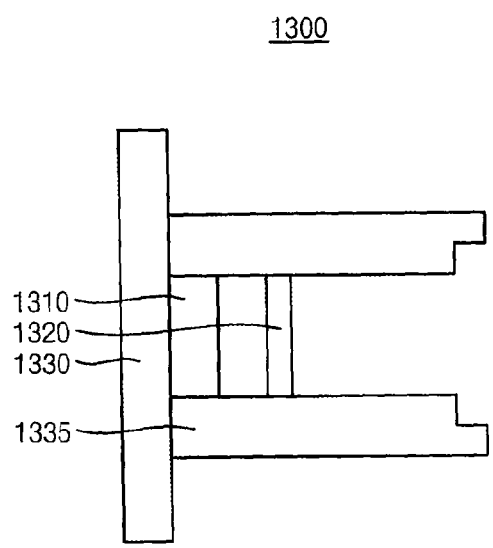
FIG. 9 is a cross-sectional view illustrating an exemplary embodiment of a light source unit according to the inventive concept.

FIG. 9 is a cross-sectional view illustrating an exemplary embodiment of the light source unit 1300 according to the inventive concept.

Referring to FIG. 9, the light source unit 1300 may include a light emitting part 1310, an optical filter part 1320, a flexible printed circuit board 1330, a holding part 1335, the color conversion member 1340, and a plurality of optical sheets.

The flexible printed circuit board 1330 may provide the light emitting part 1310 disposed thereon with driving power. In the present exemplary embodiment, the flexible printed circuit board 1330 may be disposed under the lower substrate 1121 to be adjacent to an end of the display panel 1120. For example, the flexible printed circuit board 1330 may include a resin having flexibility. The flexible printed circuit board 1330 may include a metal line disposed thereon.

The light emitting part 1310 is disposed on the flexible printed circuit board 1330. The light emitting part 1310 may generate a light. In the present exemplary embodiment, the light emitting part 1310 may be mounted on a surface of the flexible printed circuit board 1330. For example, the light emitting pan 1310 may include a light emitting diode (LED). The light emitting part 1310 may include a light source generating a light having a first color and a phosphor disposed on the light source and having a second color. For example, the first color may be blue and the second color may be red. The number of the light emitting part(s) 1310 may be determined in consideration of size and brightness of the display panel 1120. A structure of light emitting part 1310 is explained in detail referring to FIG. 10.

The optical filter part 1320 may be disposed adjacent to the light emitting part 1310. The optical filter part 1320 may filter a light from the light emitting part 1310. For example, the optical filter part 1320 may include a shortwave pass filter capable of transmitting a light having a short wavelength. A structure of optical filter part 1320 is explained in detail referring to FIG. 11.

The color conversion member 1340 may be disposed on a surface of the light guide plate 1400. The color conversion member 1340 may have a third color. A wavelength of the third color may be shorter than a wavelength of the second color. The color conversion member 1340 may include a quantum dot. The color conversion member 1340 may a sheet. The color conversion member 1340 may convert a light from the optical filter part 1320. Alternatively, the color conversion member 1340 may include a phosphor having the third color.

The holding portion 1335, sometimes called a holding part 1335, may hold the light emitting part 1310 and the optical filter part 1320. The holding portion 1335 may have an opening facing the light guide plate 1400. Thus, a light from the optical filter part 1320 may be provided to the light guide plate 1400. For example, the holding portion 1335 may include glass material.

Figure 10:
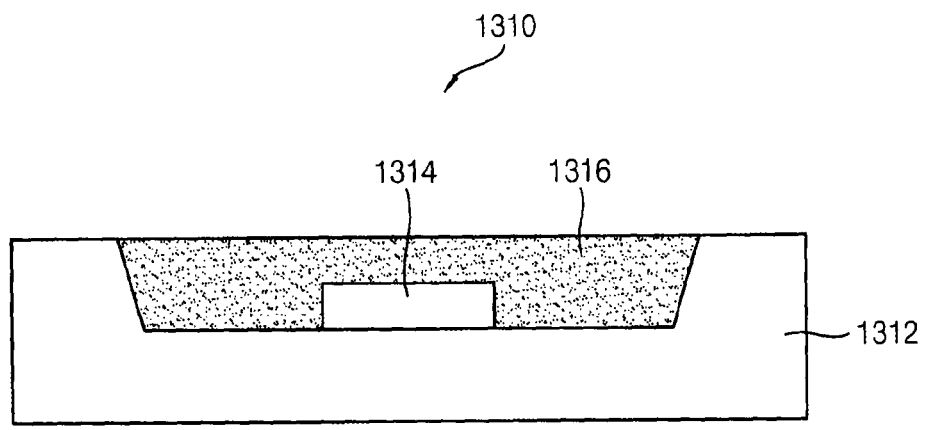
FIG. 10 is a cross-sectional view illustrating an exemplary embodiment of a light emitting part according to the inventive concept.

FIG. 10 is a cross-sectional view illustrating an exemplary embodiment of the light emitting part 1310 according to the inventive concept.

Referring to FIG. 10, the light emitting part 1310 according to an exemplary embodiment of the present inventive concept includes a receiving container 1312, a light source 1314 and a phosphor 1316.

The receiving container 1312 may receive the light source 1314 and the phosphor 1316. The receiving container 1312 includes an upper surface and a bottom surface.

The light source 1314 is disposed on the bottom surface of the receiving container 1312. In the present exemplary embodiment, the light source 1314 may include a light emitting diode chip. The light source 1314 may generate a light having a first color. For example, the light source 1314 may be a light emitting diode chip generating a light having a blue color.

The phosphor 1316 fills a receiving area formed between the upper surface and the bottom surface of the receiving container 1312. In the present exemplary embodiment, the phosphor 1316 may be a red phosphor. The light source 1314 generates the blue light and the phosphor 1316 generates a red light based on the blue light. The blue light of the light source 1314 and the red light of the phosphor 1316 are mixed so that the light emitting part 1310 emits the magenta light. For example, the phosphor 1316 may be a nitride phosphor. In addition, the phosphor 1316 may be a silicate phosphor.

In the present exemplary embodiment, the light emitting part 1310 includes the light source 1314 including a light emitting diode chip generating a blue light and the phosphor 1316 mounted on the light source 1314 and having a red color. Thus, generating of light having a shortwave may be decreased. Therefore, a reliability of the light source may be improved and a lifespan of the light source may be increased.

Figure 11:
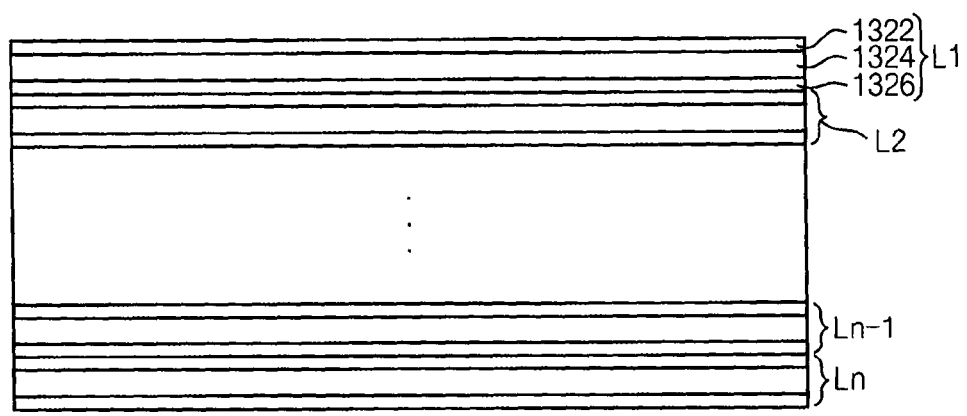
FIG. 11 is a cross-sectional view illustrating an exemplary embodiment of an optical filter part including a shortwave pass filter according to the inventive concept.

FIG. 11 is a cross-sectional view illustrating an exemplary embodiment of the optical filter part 1320, e.g., including a shortwave pass filter, according to the inventive concept.

Referring to FIGS. 8, 9, 11, the optical filter part 1320 may be disposed adjacent to the light emitting part 1310. The optical filter part 1320 may filter a light from the light emitting part 1310. For example, the optical filter part 1320 may include a shortwave pass filter capable of transmitting a light having a short wavelength.

The shortwave pass filter according to an exemplary embodiment of the present inventive concept may have a multi-layer-structure that a plurality of thin film layers are stacked. For example, the shortwave pass filter may have a multi-layer-structure that a layer including titanium dioxide and a layer including silicon dioxide are stacked alternately.

In the present exemplary embodiment, the shortwave pass filter may have a structure that a plurality of thin film layers are stacked. When the number of the thin film layers is more than nine, a transmissivity may be maximized. A first thin film layer L1 may include a first layer 1322, a second layer 1324 and a third layer 1326.

The first layer 1322 may be a thin film layer having a first thickness. The first layer 1322 may include silicon dioxide. The second layer 1324 may be a thin film layer having a second thickness twice as thick as the first thickness. The second layer 1324 may include titanium dioxide. The third layer 1326 may be a thin film layer having the first thickness. The third layer 1326 may include silicon dioxide. The first layer 1322 and the third layer 1326 may be substantially same. The first thin film layer L1 may be a layer that the first layer 1322, the second layer 1324 and the third layer 1326 are stacked sequentially.

In the present exemplary embodiment, the shortwave pass filter may have a multi-layer-structure that a plurality of thin film layers having the same structure as the first thin film layer L1 are stacked. For example, the first thin film layer L1 and a second thin film layer L2 are stacked sequentially. Thus, a third layer 1326 of the first thin film layer L1 contacts with a first layer of the second thin film layer L2. Accordingly, a third layer 1326 of the first thin film layer L1 having the first thickness and including silicon dioxide and a first layer of the second thin film layer L2 having the first thickness and including silicon dioxide are stacked sequentially, so that a layer having the second thickness and including silicon dioxide may be formed. Therefore, the shortwave pass filter may have a multi-layer-structure that a layer having the second thickness and including silicon dioxide and a layer having the second thickness and including titanium dioxide are stacked alternately. In addition, when the number of the thin film layers is more than nine, a transmissivity may be maximized.

In the present exemplary embodiment, the shortwave pass filter may filter a light from the light emitting part 1310. The light emitting part 1310 includes a light source generating a blue light and a red phosphor, so that the light emitting part 1310 generates a light having magenta color. Only a light having a short wavelength is able to pass through the shortwave pass filter. Thus, the shortwave pass filter may decrease a full-width-at-half-maximum of the light having magenta color. Therefore, a full-width-at-half-maximum of the light is decreased, so that color reproducing ratio of the light source may be increase.

Figure 12:
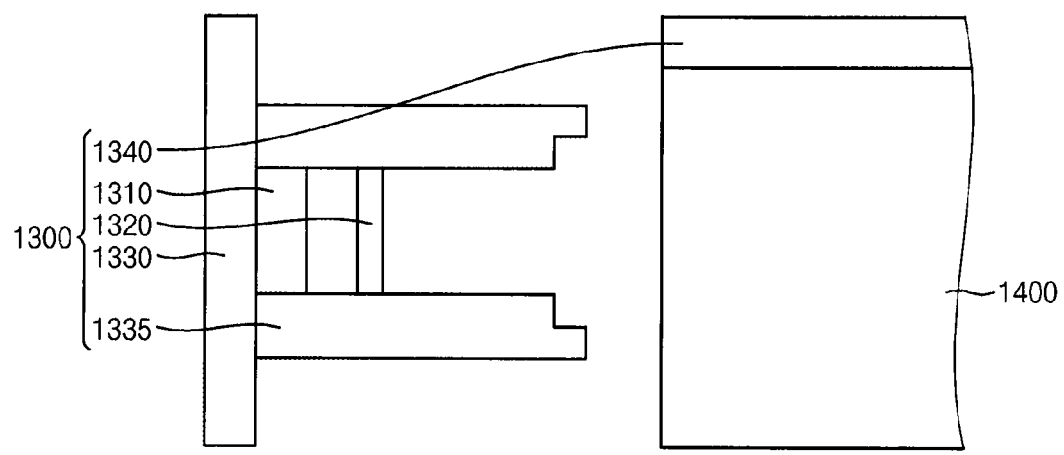
FIG. 12 is a cross-sectional view illustrating an exemplary embodiment of a back light assembly according to the inventive concept.

FIG. 12 is a cross-sectional view illustrating an exemplary embodiment of back light assembly according to the inventive concept.

Referring to FIG. 12, a back light assembly according to an exemplary embodiment of the present inventive concept may include the light source unit 1300 and the light guide plate 1400.

The light source unit 1300 may include a light emitting part 1310, an optical filter part 1320, a flexible printed circuit board 1330, a holding part 1335 and a color conversion member 1340.

The flexible printed circuit board 1330 may provide the light emitting part 1310 disposed thereon with driving power. For example, the flexible printed circuit board 1330 may include a resin having flexibility. The flexible printed circuit board 1330 may include a metal line disposed thereon.

The light emitting part 1310 is disposed on the flexible printed circuit board 1330. The light emitting part 1310 may generate a light. In the present exemplary embodiment, the light emitting part 1310 may be mounted on a surface of the flexible printed circuit board 1330. For example, the light emitting part 1310 may include a light emitting diode (LED). The Light emitting part 1310 may include a light source generating a light having a first color and a phosphor disposed on the light source and having a second color. For example, the first color may be blue and the second color may be red. The number of the light emitting part(s) 1310 may be determined in consideration of size and brightness of the display panel 1120.

The optical filter part 1320 may be disposed adjacent to the light emitting part 1310. The optical filter part 1320 may filter a light from the light emitting part 1310. For example, the optical filter part 1320 may include a shortwave pass filter capable of transmitting a light having a short wavelength.

The holding portion 1335 may hold the light emitting part 1310 and the optical filter part 1320. The holding portion 1335 may have an opening facing the light guide plate 1400. Thus, a light from the optical filter part 1320 may be provided to the light guide plate 1400. For example, the holding portion 1335 may include glass material.

The color conversion member 1340 may be disposed on a surface of the light guide plate 1400. The color conversion member 1340 may have a third color. A wavelength of the third color may be shorter than a wavelength of the second color. The color conversion member 1340 may include a quantum dot. The color conversion member 1340 may a sheet. The color conversion member 1340 may convert a light from the optical filter part 1320. For example, the second color may be red and the third color may be green. Alternately, the second color may be red and the third color may be yellow.

In the present exemplary embodiment, the color conversion member 1340 includes a quantum dot rail including only one color. When a quantum dot includes more than two colors, a heating value due to an optical absorption may be increased. In addition, the heating value is increased, so that a lifespan of the quantum dot rail may be decreased. However, the quantum dot rail according to an exemplary embodiment of the present inventive concept includes a quantum dot having only one color, the optical absorption may be minimized. Thus, a lifespan of the quantum dot rail may be increased and a manufacturing cost may be decreased.

According to the present inventive concept as explained above, the light emitting part includes the light source including a light emitting diode chip generating a blue light and the phosphor mounted on the light source and having a red color. Thus, generating of light having a shortwave may be decreased. Therefore, a reliability of the light source may be improved and a lifespan of the light source may be increased.

In addition, a full-width-at-half-maximum of the light is decreased by the shortwave pass filter, so that color reproducing ratio of the light source may be increase.

In addition, the quantum dot according to an exemplary embodiment of the present inventive concept includes only one color, so that the optical absorption may be minimized. Thus, a lifespan of the quantum dot rail may be increased and a manufacturing cost may be decreased.

The foregoing is illustrative of the inventive concept and is not to be construed as limiting thereof. Although a few exemplary embodiments have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A backlight assembly comprising:
    a light emitting part including a light source configured to generate a light having a first color, a phosphor disposed on the light source and having a second color, and a receiving container receiving the light source and the phosphor;
    an optical filter part configured to filter a light from the light emitting part;
    a color conversion member disposed adjacent to the optical filter part and having a third color, a wavelength of the third color being shorter than a wavelength of the second color; the light emitting part is disposed on a printed circuit board which provides driving power to the light emitting part;
    a holding part is projected from the printed circuit board and facing the incident surface of a light guide plate; and
    the holding part holding the light emitting part and the optical filter part, wherein light is configured to be emitted through an opening of the holding part and transmitted to the light guide plate.

2. The backlight assembly of claim 1, wherein the light source comprises a light emitting diode chip, and the first color is blue.

3. The backlight assembly of claim 1, wherein the second color is red.

4. The backlight assembly of claim 1, wherein the color conversion member comprises a quantum dot, and the third color is green or yellow.

5. The backlight assembly of claim 1, wherein the optical filter part comprises a shortwave pass filter capable of transmitting a light having a short wavelength.

6. The backlight assembly of claim 5, wherein the shortwave pass filter has a multi-layer-structure that a layer including titanium dioxide and a layer including silicon dioxide are stacked alternately.

7. The backlight assembly of claim 1, wherein the light guide plate is configured to guide a light from the light emitting part.

8. The backlight assembly of claim 7, wherein the color conversion member is disposed between the optical filter part and the light guide plate and has a bar shape.

9. The backlight assembly of claim 7, wherein the color conversion member is a quantum dot film disposed on a surface of the light guide plate.

10. The backlight assembly of claim 1, wherein the light emitting part is configured to generate a light having a magenta color.

11. A display apparatus comprising:
    a display panel configured to display an image; and
    a backlight assembly comprising:
        a light emitting part including a light source configured to generate a light having a first color, a phosphor disposed on the light source and having a second color, and a receiving container receiving the light source and the phosphor;
        an optical filter part configured to filter a light from the light emitting part;
        a color conversion member disposed adjacent to the optical filter part and having a third color, a wavelength of the third color being shorter than a wavelength of the second color; the light emitting part is disposed on a printed circuit board which provides driving power to the light emitting part;
        a holding part is projected from the printed circuit board and facing the incident surface of a light guide plate; and the holding part holding the light emitting part and the optical filter part, wherein light is configured to be emitted through an opening of the holding part and transmitted to the light guide plate.

12. The display apparatus of claim 11, wherein the light source comprises a light emitting diode chip, and the first color is blue.

13. The display apparatus of claim 11, wherein the second color is red.

14. The display apparatus of claim 11, wherein the color conversion member comprises a quantum dot, and the third color is green or yellow.

15. The display apparatus of claim 11, wherein the optical filter part comprises a shortwave pass filter capable of transmitting a light having a short wavelength.

16. The display apparatus of claim 15, wherein the shortwave pass filter has a multi-layer-structure that a layer including titanium dioxide and a layer including silicon dioxide are stacked alternately.

17. The display apparatus of claim 11, further comprising a light guide plate configured to guide a light from the light emitting part.

18. The display apparatus of claim 17, wherein the color conversion member is disposed between the optical filter part and the light guide plate and has a bar shape.

19. The display apparatus of claim 17, wherein the color conversion member is a quantum dot film disposed on a surface of the light guide plate.

20. The display apparatus of claim 11, wherein the light emitting part is configured to generate a light having a magenta color.

* * * * *